United States Patent
Cao

(10) Patent No.: US 10,014,577 B2
(45) Date of Patent: Jul. 3, 2018

(54) AERIAL MODULE AND MOBILE TERMINAL DEVICE

(71) Applicant: ZTE CORPORATION, Shenzhen, Guangdong Province (CN)

(72) Inventor: Jian Cao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 475 days.

(21) Appl. No.: 14/400,813

(22) PCT Filed: Apr. 18, 2013

(86) PCT No.: PCT/CN2013/074351
§ 371 (c)(1),
(2) Date: Nov. 13, 2014

(87) PCT Pub. No.: WO2013/170683
PCT Pub. Date: Nov. 21, 2013

(65) Prior Publication Data
US 2015/0145742 A1    May 28, 2015

(30) Foreign Application Priority Data
May 14, 2012  (CN) .......................... 2012 1 0149620

(51) Int. Cl.
*H01Q 7/00* (2006.01)
*H02J 50/10* (2016.01)
(Continued)

(52) U.S. Cl.
CPC ................. *H01Q 7/00* (2013.01); *H01Q 1/38* (2013.01); *H01Q 21/28* (2013.01); *H02J 7/025* (2013.01);
(Continued)

(58) Field of Classification Search
CPC ........ H01Q 7/00; H01Q 21/28; H01C 1/2208; H01C 1/2216; H01C 1/2225; H01C 1/2258; H01C 1/2266
See application file for complete search history.

(56) References Cited

U.S. PATENT DOCUMENTS 5,574,470 A * 11/1996 de Vall ............... G06K 7/10336
340/572.7
8,188,933 B2 * 5/2012 Nakamura ............... H01Q 7/00
343/788

(Continued)

FOREIGN PATENT DOCUMENTS

| CN | 1577965 A | 2/2005 |
|---|---|---|
| CN | 201215827 Y | 4/2009 |

(Continued)

*Primary Examiner* — Tho G Phan
*Assistant Examiner* — Patrick Holecek
(74) *Attorney, Agent, or Firm* — Ling Wu; Stephen Yang; Ling and Yang Intellectual Property

(57) ABSTRACT

The present document discloses an antenna module and a mobile terminal device, the antenna module includes an NFC antenna and a wireless charging antenna, the NFC antenna includes a flexible circuit board and an NFC antenna coil disposed thereon; the wireless charging antenna includes a flexible circuit board and a wireless charging antenna coil disposed thereon; the NFC antenna and the wireless charging antenna share one flexible circuit board, and the wireless charging antenna coil is disposed at a position without antenna wiring in the middle of the NFC antenna coil; the ends of the NFC antenna coil and the wireless charging antenna coil form contacts extending out of the flexible circuit board; the mobile terminal device includes the abovementioned antenna module; the antenna module is attached to the inner side of the housing of the mobile terminal, or the surface of the battery body facing the battery cover.

8 Claims, 2 Drawing Sheets

(51) Int. Cl.
*H02J 7/02* (2016.01)
*H02J 50/70* (2016.01)
*H01Q 21/28* (2006.01)
*H01Q 1/38* (2006.01)
*H02J 17/00* (2006.01)

(52) U.S. Cl.
CPC .............. *H02J 17/00* (2013.01); *H02J 50/10* (2016.02); *H02J 50/70* (2016.02)

(56) References Cited

U.S. PATENT DOCUMENTS

| | | | | |
|---|---|---|---|---|
| 8,514,135 | B2 * | 8/2013 | Jang | H01Q 1/2225 343/700 MS |
| 8,905,317 | B1 * | 12/2014 | Hsu | G06K 7/10356 235/492 |
| 8,907,858 | B2 * | 12/2014 | Yang | H01Q 7/00 343/702 |
| 8,922,162 | B2 * | 12/2014 | Park | H02J 7/00 320/108 |
| 9,008,574 | B2 * | 4/2015 | Frankland | H01Q 1/243 455/41.1 |
| 9,607,757 | B2 * | 3/2017 | Hirobe | H01Q 5/40 |
| 2009/0009415 | A1 * | 1/2009 | Tanska | G06K 7/10336 343/742 |
| 2009/0230777 | A1 * | 9/2009 | Baarman | H01F 38/14 307/104 |
| 2011/0018498 | A1 | 1/2011 | Soar | |
| 2011/0316475 | A1 * | 12/2011 | Jung | H02J 7/025 320/108 |
| 2015/0303561 | A1 * | 10/2015 | Yang | H01Q 1/2266 343/842 |

FOREIGN PATENT DOCUMENTS

| | | |
|---|---|---|
| CN | 201303054 Y | 9/2009 |
| CN | 101577361 A | 11/2009 |
| CN | 102709686 A | 10/2013 |
| TW | 424550 U | 3/2012 |

* cited by examiner

AERIAL MODULE AND MOBILE TERMINAL DEVICE

TECHNICAL FIELD

The present document relates to an antenna module and a mobile terminal device, and more particularly, to an antenna module and a mobile terminal device supporting NFC and wireless charging functions.

BACKGROUND OF THE INVENTION

Near Field Communication (referred to as NFC) is evolved from integrating the non-contact radio frequency identification (RFID) and interoperability technologies, and can perform identification and data exchange between a plurality of compatible electronic devices in near field by integrating the induction card reader, induction IC card and point-to-point functions on a single chip. This technology initially was a simple merger of the RFID and network technologies and has now evolved into a near field wireless communication technology, and it develops rapidly. The NFC chip only needs to be mounted on the mobile terminal to achieve electronic micropayment and read information of other NFC devices or labels. The near field interaction of the NFC significantly simplifies the entire authentication and identification process, making access between the electronic devices more direct, safer and clearer. Wireless connection can be easily and quickly performed between a plurality of devices such as NFC, computers, digital cameras, mobile phones and PDAs, thus achieving data exchange and services.

The function of the mobile device is increasingly powerful and has become an indispensable tool of communication and entertainment for most people. However, the problem of insufficient battery life has been plaguing manufacturers and consumers, and in the current situation that the screen of the smart mobile device becomes bigger and bigger and the functions become more and more powerful, the frequency of charging is increasing, which brings a lot of inconveniences to the consumers.

However, both the NFC antenna and the wireless charging antenna require to occupy a large area of space, while with the mobile terminal developing toward the directions of larger screen, thinner thickness and longer standby time, the actual usable area of space of the antennas is getting tight, which requires us to design a new form that the NFC antenna and wireless charging coil coexist to meet the antenna needs of complex models.

SUMMARY

To solve the technical problem, the present document provides an antenna module and a mobile terminal device, to multiplex the space of the NFC antenna and the wireless charging antenna which appear in the form of one module, thus avoiding the problem that the area of space occupied by the two antennas is relatively large.

To solve the abovementioned technical problem, the technical scheme of the present document is: an antenna module, comprising a near-field wireless communication (NFC) antenna and a wireless charging antenna, wherein the NFC antenna comprises a flexible circuit board and an NFC antenna coil disposed on that flexible circuit board, the wireless charging antenna comprises a flexible circuit board and a wireless charging antenna coil disposed on that flexible circuit board, the NFC antenna and the wireless charging antenna share one flexible circuit board, and the wireless charging antenna coil is disposed at a position without antenna wiring in the middle of the NFC antenna coil, the ends of the NFC antenna coil and the wireless charging antenna coil form contacts extending out of the flexible circuit board.

The NFC antenna further comprises a ferrite, and the ferrite is attached to the NFC antenna coil.

The wireless charging antenna further comprises a ferrite, and the ferrite is attached to the wireless charging antenna coil.

Both sides of the flexible circuit board are configured with the NFC antenna coil and the wireless charging antenna coil.

The present document further discloses a mobile terminal comprising: a housing, a motherboard, a battery and an antenna module, wherein the antenna module adopts the abovementioned antenna module.

The contacts of the NFC antenna are connected to an antenna spring plate disposed on the motherboard and connected with the NFC circuit, the contacts of the wireless charging antenna are connected to an antenna spring plate provided on the motherboard and connected with the wireless charging antenna circuit.

The antenna module is attached to an inner side of the housing, or the antenna module is attached to a surface of the battery body facing a battery cover.

The mobile terminal device is a mobile phone, a PDA or another mobile communication device.

The present document discloses an antenna module and a mobile terminal. Since both the NFC communication and the wireless charging use the electromagnetic induction law, the high frequency alternating magnetic field between the antenna coils is used for data transmission. The working principle of the wireless charging antenna is basically the same as that of the NFC antenna, thus the present document multiplexes the space occupied by both of the antennas, and the NFC antenna and the wireless charging antenna constitute one antenna module which can support both the NFC function and the wireless charging function, and save the space inside the mobile terminal.

BRIEF DESCRIPTION OF THE DRAWINGS

The accompanying drawings are included to further understand the present document, and the accompanying drawings are incorporated into the present specification and constitute a part of this specification, and illustrate the embodiments of the present document, and the accompanying drawings, together with the description, are used to explain the principles of the present document.

PREFERRED EMBODIMENTS OF THE INVENTION

Figure 1:
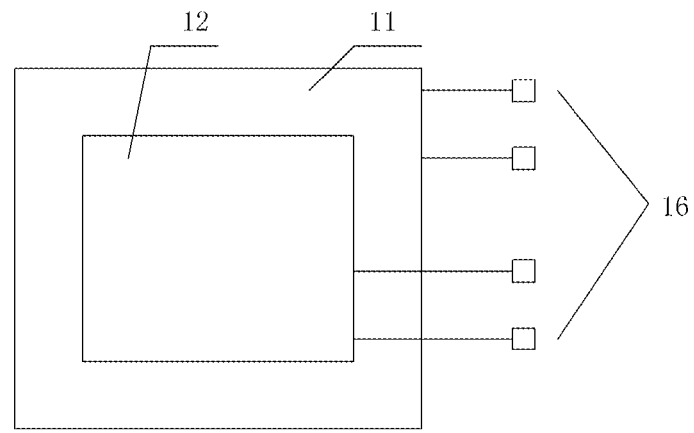
FIG. 1 is a block diagram of an antenna module.

In the following, the present document will be described more thoroughly with reference to the accompanying drawings, wherein the embodiments of the present document are illustrated in the accompanying drawings. However, the present document may be embodied in many different forms and should not be construed as limited to the embodiments set forth herein. More specifically, these embodiments are provided to make the disclosure of the present document thorough and complete, and fully convey the scope of the present document to those skilled in the art. In the accompanying drawings, for clarity, the size and relative sizes of layers and areas are exaggerated. In the accompanying drawings, same reference numerals are used to designate same elements.

Figure 2:
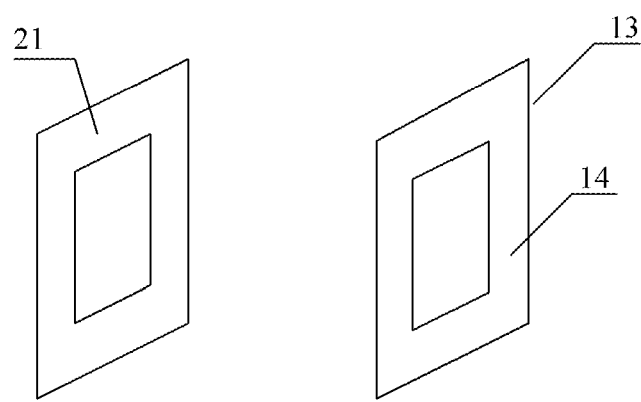
FIG. 2 is an exploded view of an NFC antenna in accordance with an embodiment of the present document.
Figure 3:
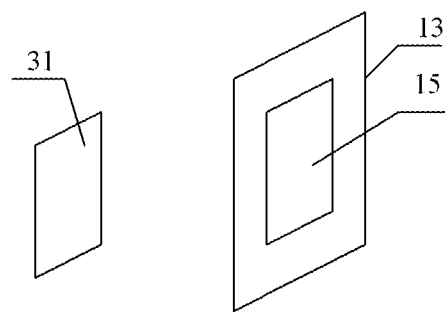
FIG. 3 is an exploded view of a wireless charging antenna in accordance with an embodiment of the present document.
Figure 4:
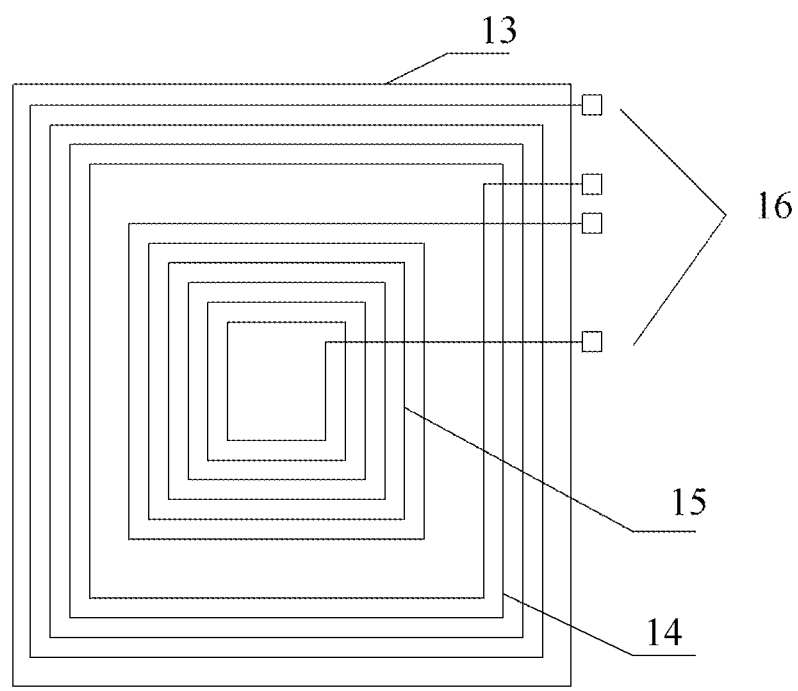
FIG. 4 is a wiring diagram of an NFC antenna coil and a wireless charging antenna coil in accordance with an embodiment of the present document.

According to FIG. 1 to FIG. 4, the present document relates to an antenna module comprising an NFC antenna 11 and a wireless charging antenna 12, the NFC antenna 11 comprises a flexible circuit board 13 and an NFC antenna coil 14 disposed on the flexible circuit board, the wireless charging antenna 12 comprises the flexible circuit board 13 and a wireless charging antenna coil 15 disposed on the flexible circuit board, the NFC antenna 11 and the wireless charging antenna 12 share the flexible circuit board 13, and the coil 15 of the wireless charging antenna 12 is attached at a position without antenna wiring in the middle of the coil 14 of the NFC antenna 11. The NFC antenna 11 further comprises a ferrite 21, and the coil 14 of the NFC antenna 11 is attached with the ferrite 21, the wireless charging antenna 12 further comprises a ferrite 31, the coil 15 of the wireless charging antenna 12 is attached with the ferrite 31, the flexible circuit board 13 is a double-sided board, and both sides of the flexible circuit board 13 are configured with the NFC antenna coil 14 and the wireless charging antenna coil 15, the ends of the NFC antenna coil 14 and the wireless charging antenna coil 15 form contacts 16 extending out of the flexible circuit board 13, the center of the ferrite 21 is hollowed, the size of the gap matches with the size of the wireless charging antenna coil 15, and the ferrite 31 is disposed in the gap.

The present document further discloses a mobile terminal, comprising a housing, a motherboard, a battery and an antenna module, the contacts 16 of the NFC antenna 11 are connected to the antenna spring plate disposed on the motherboard and connected with the NFC circuit, the contacts 16 of the wireless charging antenna 12 are connected to the antenna spring plate disposed on the motherboard and connected with the wireless charging antenna circuit, and the antenna module is attached to the inner side of the housing or the surface of the battery body facing the battery cover.

In the present document, the coils of the NFC antenna 11 and the wireless charging antenna 12 are two separate coils, the ferrites 21 and 31 respectively correspond to the NFC antenna coil 14 and the wireless charging coil 15, and the two antennas 11 and 12 form one module, in the present document, the space occupied by the NFC antenna 11 and the wireless charging antenna 12 is multiplexed to minimize the space occupied by the antenna, and the antenna module is disposed in the mobile terminal, reducing the space inside the mobile terminal occupied by the antenna, moreover, the NFC function and the wireless charging function are achieved simultaneously. The ferrites 21 and 31 are further deposed in the antenna module to shield the effect of the motherboard of the terminal device on the antenna signals.

The mobile terminal in the present document may or may not have the LCD. The mobile terminal may support modes such as LTE, WCDMA, GSM, and CDMA. The mobile terminal can support voice calls only, data services only, or both voice calls and data services.

The mobile terminal is a mobile phone, a PDA or another mobile communication device.

INDUSTRIAL APPLICABILITY

The present document discloses an antenna module and a mobile terminal. Since both the NFC communication and the wireless charging use the electromagnetic induction law, the high frequency alternating magnetic field between the antenna coils is used for data transmission. The working principle of the wireless charging antenna is basically the same as that of the NFC antenna, thus in the present document, the space occupied by both of the antennas is multiplexed, and the NFC antenna and the wireless charging antenna form one antenna module which can support both the NFC function and the wireless charging function, and save the space inside the mobile terminal.

What is claimed is:

1. An antenna module, comprising: a near-field wireless communication (NFC) antenna and a wireless charging antenna, wherein the NFC antenna comprises a flexible circuit board and an NFC antenna coil disposed on that flexible circuit board, the wireless charging antenna comprises a flexible circuit board and a wireless charging antenna coil disposed on that flexible circuit board, the NFC antenna and the wireless charging antenna are two different antennas and share one flexible circuit board, the wireless charging antenna coil is disposed at a position without antenna wiring in the middle of the NFC antenna coil, and ends of the NFC antenna coil and the wireless charging antenna coil form contacts extending out of the flexible circuit board;

wherein the NFC antenna further comprises a first ferrite, and the first ferrite is attached to the NFC antenna coil, and the wireless charging antenna further comprises a second ferrite, and the second ferrite is attached to the wireless charging antenna coil, wherein the center of the first ferrite of the NFC antenna is hollowed, a size of the hollow matches with a size of the wireless charging antenna coil, and the second ferrite of the wireless charging antenna is disposed in the hollow.

2. The antenna module of claim 1, wherein, both sides of the flexible circuit board are configured with the NFC antenna coil and the wireless charging antenna coil.

3. A mobile terminal device, comprising: a housing, a motherboard, a battery and an antenna module, wherein, the antenna module adopts the antenna module of claim 1.

4. The mobile terminal device of claim 3, wherein, the contacts of the NFC antenna are connected to an antenna spring plate disposed on the motherboard and connected with the NFC circuit, the contacts of the wireless charging antenna are connected to an antenna spring plate disposed on the motherboard and connected with the wireless charging antenna circuit.

5. The mobile terminal device of claim 3, wherein, the antenna module is attached to an inner side of the housing; or the antenna module is attached to a surface of the battery body facing a battery cover.

6. The mobile terminal device of claim 3, wherein, the mobile terminal device is a mobile phone, a personal digital assistant or another mobile communication device.

7. The mobile terminal device of claim 4, wherein, the antenna module is attached to an inner side of the housing; or the antenna module is attached to a surface of the battery body facing a battery cover.

8. The mobile terminal device of claim 4, wherein, the mobile terminal device is a mobile phone, a personal digital assistant or another mobile communication device.

* * * * *